United States Patent

[11] 3,612,169

[72] Inventors James T. Matsuoka
 Brecksville;
 Armindo Cantarutti, Akron, both of Ohio
[21] Appl. No. 803,196
[22] Filed Feb. 28, 1969
[45] Patented Oct. 12, 1971
[73] Assignee Intercole Automation, Inc.
 Cleveland, Ohio

[54] TEMPERATURE-CONTROLLED BLADED ROTOR
 2 Claims, 6 Drawing Figs.
[52] U.S. Cl. .................................................. 165/86
[51] Int. Cl. ................................................. F28f 5/06
[50] Field of Search .......................................... 165/86–88, 92

[56] References Cited
UNITED STATES PATENTS

| | | | |
|---|---|---|---|
| 158,246 | 12/1874 | Chesebrough | 165/87 |
| 2,731,241 | 1/1956 | Christian | 165/87 |
| 3,263,748 | 8/1966 | Jemal et al. | 165/87 |

Primary Examiner—Edward J. Michael
Attorney—Watts, Hoffmann, Fisher & Heinke

ABSTRACT: A bladed rotary member for working and/or mixing materials such as rubber, plastic and the like, with helical passageways extending lengthwise of and beneath a generally helically curved surface of a blade portion, through which heat transfer liquid is circulated.

PATENTED OCT 12 1971

INVENTORS
JAMES T. MATSUOKA
ARMINDO CANTARUTTI
BY
Watts, Hoffmann, Fisher & Heinke
ATTORNEYS.

TEMPERATURE-CONTROLLED BLADED ROTOR

TECHNICAL FIELD

This invention relates to bladed rotary members for machines used to mix rubber or plastic material and the like having improved heat transfer capabilities.

DESCRIPTION OF PRIOR ART

Machines for mixing rubber or plastic material and the like in which the material is worked and mixed by one or more rotors in a chamber and then discharged are well known. Typically, the temperature of the material being mixed is raised due to the mechanical working effected during mixing. Prior arrangements for at least partially controlling the temperature of the material during mixing have included passageways for the circulation of heat exchange fluid in wall portions of mixing chambers and supply pipes extending within hollow rotors to establish a general flow of heat exchange fluid within the rotor or rotors from one end toward the other. This basic approach to rotor cooling has advantages in its simplicity, but is relatively inefficient in transferring heat, since a large volume flow must be established throughout the entire central cavity of the rotor, to move a small portion of the flow along and in direct contact with the inner surfaces of the rotor blades, where heat transfer takes place. In addition, the flow is insulated from the material being mixed by the thickness of the blade wall, which may typically be about 2 inches.

SUMMARY OF THE INVENTION

The present invention provides a rotary member for working and/or mixing material, such as rubber, plastic and the like, in which heat transfer fluid can be conducted through the walls of a curved rotor blade close to the outer surface thereof to efficiently transfer heat between the surface of the rotor blade and heat transfer fluid circulated within the blade. Rotary members of the type contemplated include mixing rotors with two or more blades, such as the type used in enclosed mills or mixers, and extruder screws, and the like.

Such circulation and heat transfer is effectively attained in a preferred embodiment of this invention by providing a passageway lengthwise of the blade and a short distance beneath a working surface of a rotor blade, which passageway curves with the blade surface. A supply inlet and an exhaust outlet are provided to and from said passageway. Preferably, the inlet and outlet communicate between the passageway and a central cavity of the rotor blade so that heat transfer fluid can be circulated through both a central cavity and through the passageway as well.

Advantageously, a plurality of series-connected passageways are provided, one beneath the surface of a tip portion of the blade and one or more others in general side-by-side relationship beneath a working surface of the blade adjacent the tip portion, each extending lengthwise of the blade and being curved longitudinally to follow the contour of the blade and spaced from the next, preferably a uniform distance along its entire length.

In the preferred embodiment of this invention, the curved passageways beneath the surface of a rotor blade are initially formed as milled grooves in the helically contoured outer surface of the blade, and that portion of the blade surface directly over each passageway is comprised of a strip of suitable blade-forming material secured, as by welding, to the blade along opposite sides of the outer portions of the original grooves. Heat transfer fluid is supplied to and exhausted from the passageways through conduits or ducts extending inwardly from the passageways to the central cavity of the rotor. The smooth milled surface on the inside of the passageways reduces their resistance to flow to a minimum and assures a maximum flow velocity, hence, maximum throughput of heat transfer fluid under any given conditions, thereby enhancing the heat transfer rate.

In order to further enhance the heat transfer characteristics of rotor blades as described above, which have a typical blade contour that is tapered in a radial direction to a narrow tip portion, a plurality of outlets are provided from the passageway in the wall of the rotor blade remote from the inlet and these outlets are directed into the central cavity adjacent the tip portion of the blade, an area in which circulation is otherwise relatively poor, but at which location heat transfer is especially important. The preferred embodiment of this invention further provides for the inlet of heat transfer fluid to the curved passageway in the tip portion of the blade through a duct or conduit within an end shroud of the rotor at the outer end of the blade, which duct terminates at said passageway. The inner end of the duct is supplied with fluid from a pipe supported within the central cavity of the rotor, through pipe support means that extends between the pipe and the inner end of the duct at an inner rotor surface adjacent the shroud.

From the foregoing it will be apparent that an object of this invention is to obtain improved heat transfer characteristics in a curved blade of a rotary member used for mixing or working materials, such as rubber, plastic and the like, by providing a passageway directly beneath surface portions of the blade, which passageway follows the surface contour of the curved blade and through which heat transfer fluid can be circulated.

This and other objects as well as the features and advantages of the invention referred to above will become more apparent from the detailed description that follows, when considered in connection with the accompanying drawings.

DESCRIPTION OF THE INVENTION

Figure 1:
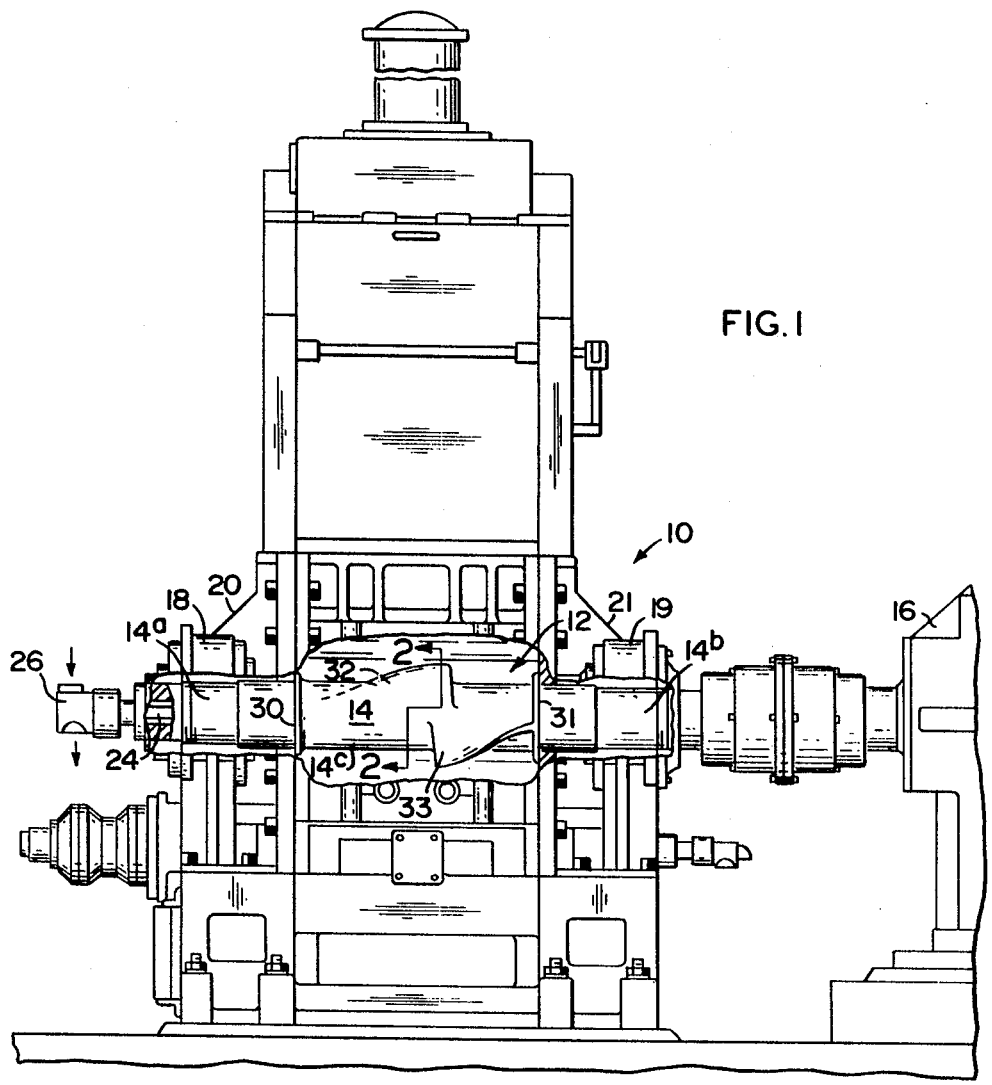
FIG. 1 is a side elevational view, with parts broken away, illustrating a mixing machine having a rotor embodying the present invention.

A mixing machine embodying the invention is shown in FIG. 1 of the drawings and indicated generally by reference numeral 10. The machine includes a mixing chamber 12 in which material such as rubber, plastic or the like is mixed by two side-by-side counterrotating rotors, one of which is shown at 14. The rotors 14 are driven by a drive unit 16 to mix material contained within the chamber 12. Opposite end sections 14a, 14b of the rotors are journaled in bearings (not shown) in bearing housings 18, 19, which are part of spaced end frames 20, 21, respectively, of the machine. A pipe 24 is associated with each rotor 14 for carrying heat transfer fluid to an internal cavity of the rotor. The pipe extends within the central cavity and communicates through the end section 14a, outside the bearing housing 18, to stationary supply and exhaust conduits (not shown) through a rotary union 26. This end of the rotor through which the pipe communicates is typically referred to as the "water end."

Figure 2:
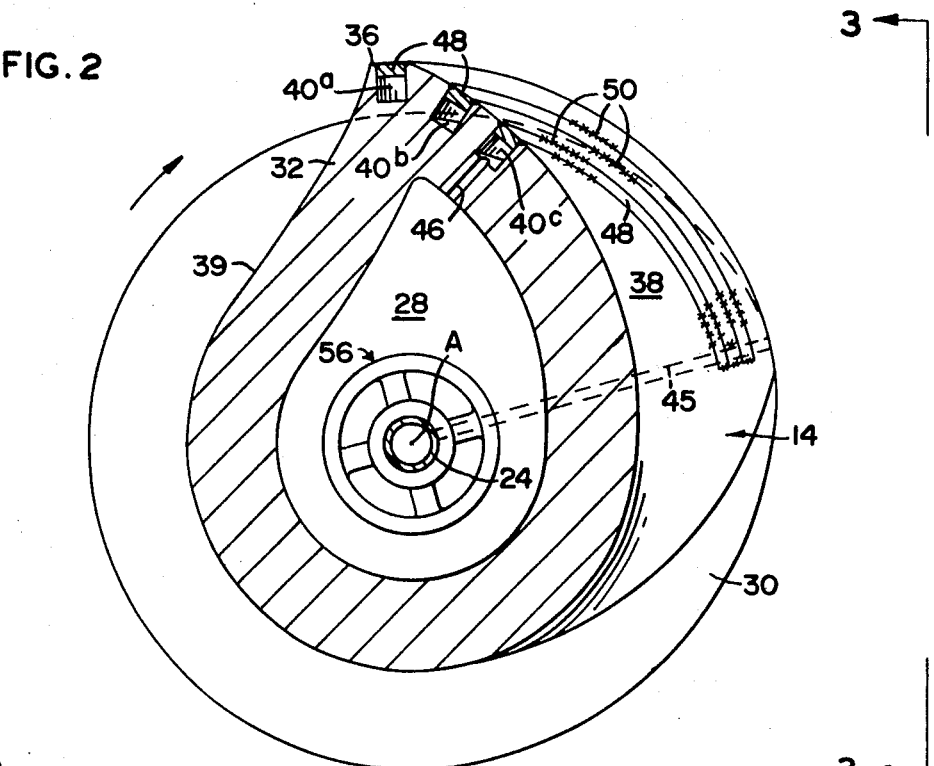
FIG. 2 is a sectional view taken along the line 2—2 of FIG. 1 and looking in the direction of the arrows.
Figure 3:
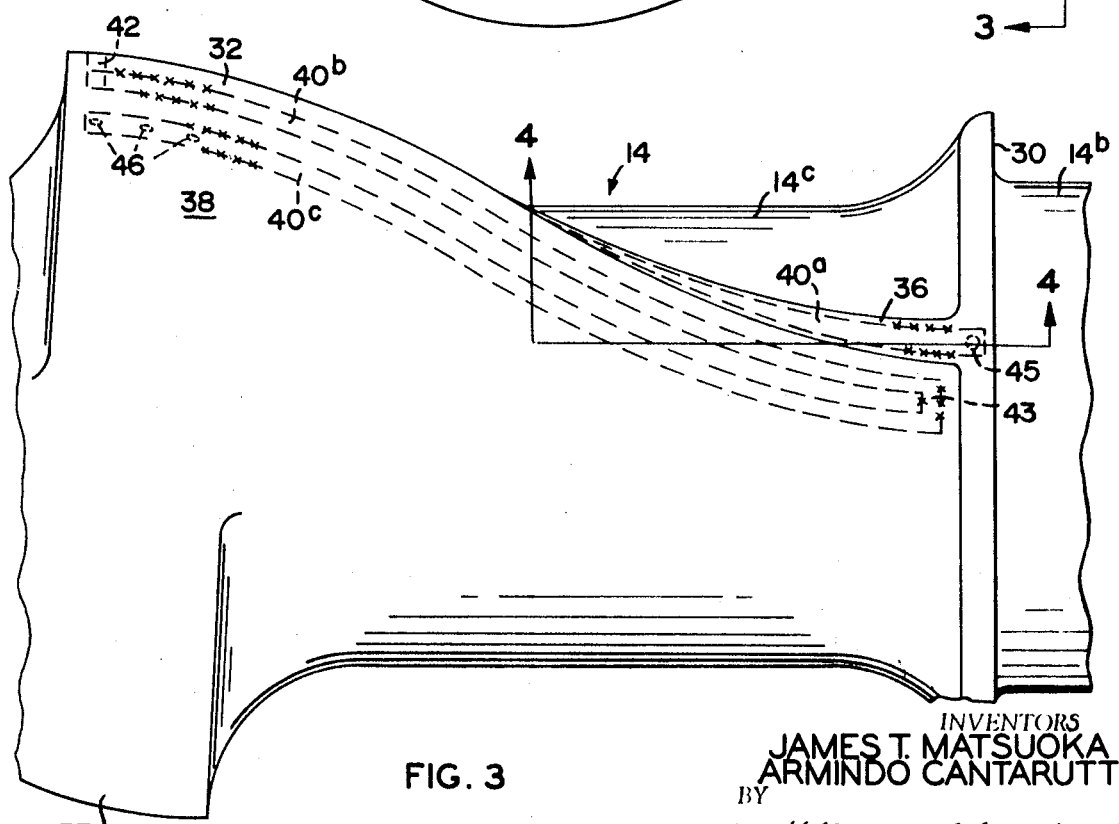
FIG. 3 is a partial side elevational view of the rotor of FIG. 2, viewed approximately from the plane indicated by the line 3—3 of FIG. 2 and looking in the direction of the arrows.

In accordance with this invention, the rotors 14 are constructed with passageways in the rotor walls for the circulation of heat transfer fluid adjacent the outer surfaces of the blades of the rotor. Each rotor 14, as best shown in FIGS. 1 and 2 of the drawings, is in the form of a hollow, elongated body having a central longitudinal axis of rotation A and a central longitudinal cavity 28 that extends substantially the length of the body. A central bladed portion 14c is located between the two end sections 14a, 14b, separated therefrom by flangelike radial shrouds 30, 31. The bladed section 14c includes two blades 32, 33 extending from the two shrouds 30, 31 in an inward axial direction. The blade 32 is axially longer than the blade 33 and both overlap at the inner ends. Each blade is diametrically opposed from the other at the inner ends and is twisted, preferably helically as shown, through approximately 78° of angular travel or rotation along its axial length to the respective shroud. As best shown in FIGS. 2 and 3 in connection with the blade 32, each blade has a generally flat tip portion 36 that curves helically from the inner end of the blade to the shroud and which is equidistant at all points from the central axis A so that it lies in the surface of an imaginary cylinder. This tip surface is adapted to move directly adjacent a cylindrically shaped portion of the inner wall surface of the mixing chamber 12 and serves to shear the material being mixed by establishing a very narrow moving gap between the rotor and the chamber wall, through which the material is forced by the curvature and rotating action of the rotor blade. Each blade also has a convexly curved leading surface 38 and a concave trailing surface 39, both of which curve helically in the axial direction and establish a tapered shape to the blade in an outward radial direction, in transverse planes. A portion of the convexly curved leading surface 38 adjacent the tip portion 36, along with the tip portion itself, accomplishes a majority of the shearing and working of the material within the mixing chamber and these areas therefore generate substantial heat in the material and tend to become quite hot themselves.

A plurality of passageways 40 are provided in each blade 32, 33, extending in a helical path along the length of the respective blade. In the preferred construction one passageway is located beneath the outer surface of the tip portion 36 and others are located beneath the adjacent leading surface 38 to carry heat transfer fluid within the wall of the blade, adjacent those surfaces which become most heated due to the working of the material being mixed. This provides effective temperature control with minimum passageways. Three passageways 40a, b, c are shown in connection with the longer blade 32 of the rotor 14 in FIGS. 2 and 3 of the drawings, adjacent surfaces where the principal shearing of the material takes place. The structure is the same for the shorter blade 33, and only the passageways in connection with blade 32 are described in detail.

The passageway 40a extends helically beneath the surface of the tip portion 36 from the shroud 30 to just short of the inner end of the blade 32. The passageway 40b is located alongside the passageway 40a, spaced a short distance peripherally and located beneath the convexly curved leading surfaces 38. The passageway 40c is located adjacent the passageway 40b, peripherally farther from the tip portion 36. The two passageways 40b, 40c terminate at their inner end adjacent the inner end of the longer blade 32 and terminate at the outer end adjacent but short of the shroud 30. Each passageway 40a, 40b, 40c is spaced uniformly along its length from the next adjacent passageway and therefore each is curved helically, following the contour of the tip portion 36 and leading surface of the blade 38. A transverse connecting passageway 42 extends from the inner end of the passageway 40a to the inner end of the passageway 40b. A second transverse connecting passageway 43 extends between the end of each passageway 40b, 40c adjacent the shroud 30. Additional passageways can be provided, if desired, and the specific location of the passageways can be varied from that shown. For example, spaced passageways can be located beneath the entire leading surface of the blade or beneath all major surfaces, leading and trailing, for maximum temperature control. Where passageways underlie a large portion of the blade area, circulation of heat transfer fluid within the central cavity of the blade may be omitted and the fluid can be circulated directly through the passageways.

An inlet conduit 45 to the connected passageways 40 extends radially through the shroud 30 from the central cavity 28 to the end of the passageway 40c, A plurality of outlet apertures 46, for example, three, at the inner end of the passageway 40c, extend from the passageway 40c inwardly to the central cavity 28 adjacent the inner tip portion of the cavity, a zone in the central cavity in which the circulation of heat transfer fluid is relatively poor. By directing the outlets 46 into this tip portion of the cavity, and by providing a plurality of outlets along a portion of the length of the cavity, circulation is enhanced within the central cavity by the discharge flow from the passageways 40.

With the above construction, it will be seen that a series flow is established from the pipe 24, through the conduit 45, to the end of the passageway 40a in the shroud 30. The flow then proceeds through the passageway 40a, across the transverse passageway 42 to the passageway 40b, thence along the passageway 40b from the inner end of the blade 32 toward the shroud 30, and then through the transverse passageway 43 to the passageway 40c. The flow proceeds along the passageway 40c toward the inner end thereof, and is discharged through the outlet apertures 46.

Figure 4:
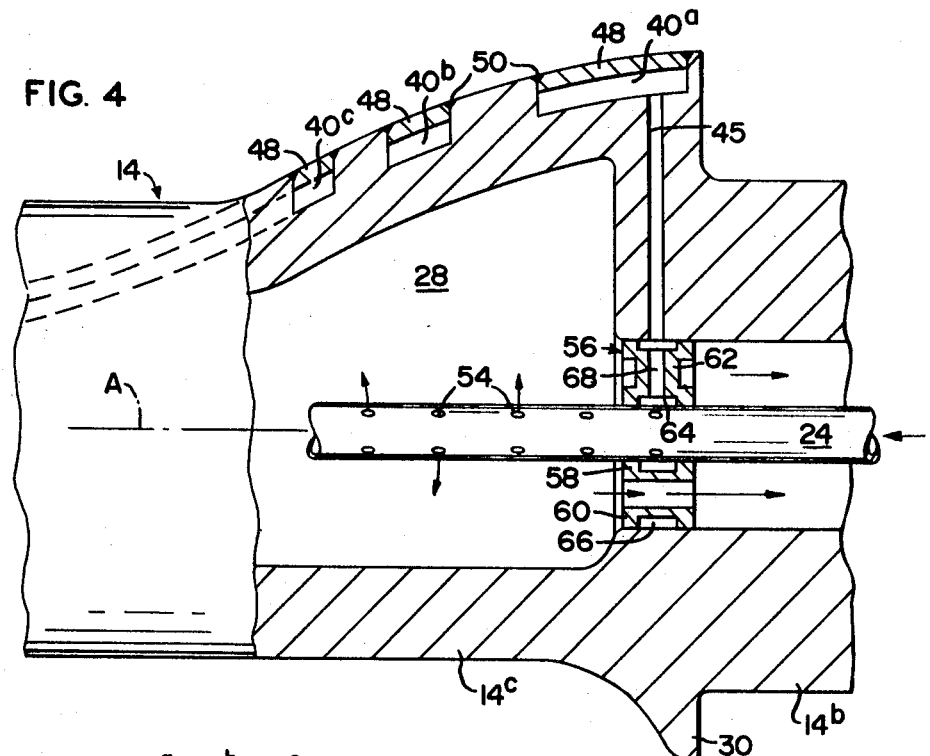
FIG. 4 is a partial longitudinal sectional view taken approximately along the line 4—4 of FIG. 3 and looking in the direction of the arrows.

The passageways 40 can be satisfactorily formed by a milling process, because each passageway is located a constant radial distance from the central axis of the rotor along its entire length and because each passageway curves in a uniform helix along its length. Thus, with relative axial movement between a rotor and a milling cutter, coupled with a programmed rotation of the rotor about its longitudinal axis, a helical groove can be conveniently milled. The groove is milled to the desired depth, substantially deeper than the ultimate height of the passageway 40. The upper part of the groove is then filled or closed by an insert strip 48 (see FIGS. 2 and 4) that fits tightly within the groove and forms the outer surface of the rotor above the respective passageway 40. Each strip 48 is welded along its edges, as indicated at 50. The strips 48 are preferably of a wear-resistant steel and, when welded in place, become an integral part of the outer surface of the rotor. Similar strips (not shown) are used to close the transverse connecting passageways 42, 43 which are milled in the surface of the rotor in a separate operation. Prior to inserting the strips 48, the conduit or duct 45 and the outlet apertures 46 are drilled at the proper locations through the respective groove. Because the grooves are milled, the inner surfaces are smooth and create little resistance to the flow of fluid. After the strips 48 are welded in place, further finishing or grinding operations may be performed to provide a smooth leading surface 38. While the above manner of constructing the groove 40 is preferred, the grooves can be formed otherwise than as specifically described; for example, they can be initially cast in the rotor blade.

The pipe 24 extending through the central cavity 28 of the rotor 14 includes spaced apertures 54 along its length, for emitting heat transfer fluid supplied through the pipe. In order to direct a portion of the flow of heat transfer fluid from the fluid supply pipe through the passageways 40 in the blade 32 and through corresponding passageways in the blade 33, pipe supports 56 in the form of spiders having radial passageways are provided to support the pipe 24 within the central cavity at each shroud 30, 31. Both pipe support spiders are identical and only the support 56 at the shroud 30 will be described in detail, in connection with FIG. 4. The pipe support or spider 56 has a central hub 58 that tightly surrounds the pipe 24, an outer rim 60 that fits closely within a circular portion of the central cavity 28 at the plane of the shroud 30, and a plurality of radial spokes 62 connecting the central hub and the rim. The hub 58 has an annular groove 64 and the rim 60 has an annular groove 66. Radial conduits 68 extend through the spokes 62 and connect the two annular grooves 64, 66. The annular groove 64 encircles a plurality of apertures 54 of the pipe 24, and the conduit 45 through the shroud 30 communicates with the annular groove 66. Thus, the spider or pipe support 56 acts as a conduit from the central pipe 24 to the conduit or duct 45 in the shroud 30, while permitting axial flow of discharged heat transfer fluid along the central cavity 28, through the end portion 14a of the rotor to the discharge outlet at the rotary union 26. In a preferred construction, the pipe support spiders are fixed with respect to both the blade and the pipe, so that the pipe, spider and blade rotate together. Alternatively, the pipe can remain stationary with the spider providing a bearing support to permit relative rotation between the pipe and the rotor, while yet transmitting the flow of liquid to the conduit 45 by virtue of the continuous annular grooves 64, 66 in the hub and rim.

Figure 5:
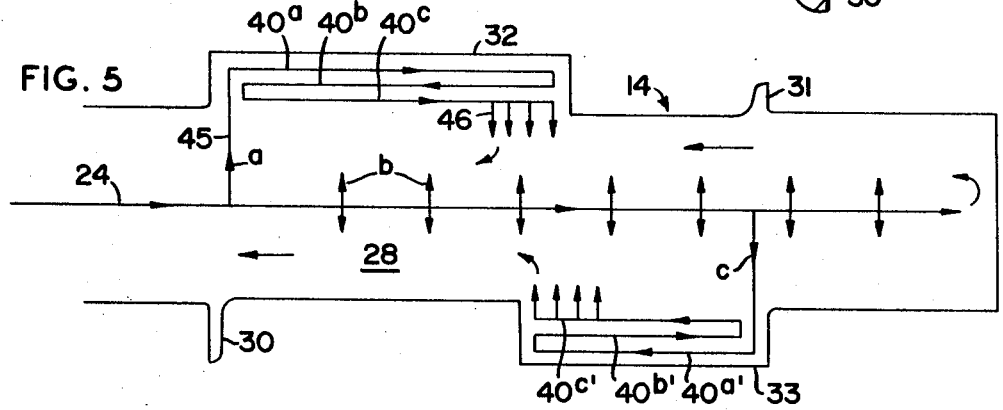
FIG. 5 is a schematic flow diagram of the rotor of FIG. 1, illustrating the path of cooling fluid through the rotor.

The manner in which heat transfer fluid flows to and from the rotors is shown diagrammatically in FIG. 5 of the drawings. The rotor 14 shown has the large blade 32 adjacent the fluid inlet end of the rotor. It will be understood that the blades of the other rotor in the mixing machine are reversed, and with the smaller blade being adjacent the inlet end. The flow would therefore be initially diverted to the smaller blade and the pattern of flow would be as if directed from the opposite direction from that shown diagrammatically in FIG. 5. As shown, liquid, such as cooling water, is introduced under pressure to the pipe 24 and flows within the pipe in the central cavity of the rotor. A flow of liquid follows the path designated $a$ from the pipe 24, through the conduit 45 to the passageways 40$a$, $b$, $c$ in the larger blade 32. This liquid is discharged through the outlet apertures 46 back to the central cavity 28. Additional liquid passing through the pipe 24 escapes through apertures 54 along the length within the central cavity 28, as indicated by the arrows $b$. Fluid discharged from the pipe 24 adjacent the shroud 31 is directed through a pipe support spider to the passageways of the smaller blade 33 in a flow indicated by reference character $c$, which flow corresponds generally to the flow $a$, and passes through three series-connected passageways 40$a'$, $b'$, $c'$ in the smaller blade and is discharged through outlet apertures at the inner end of the blade, to the central cavity 28.

Figure 6:
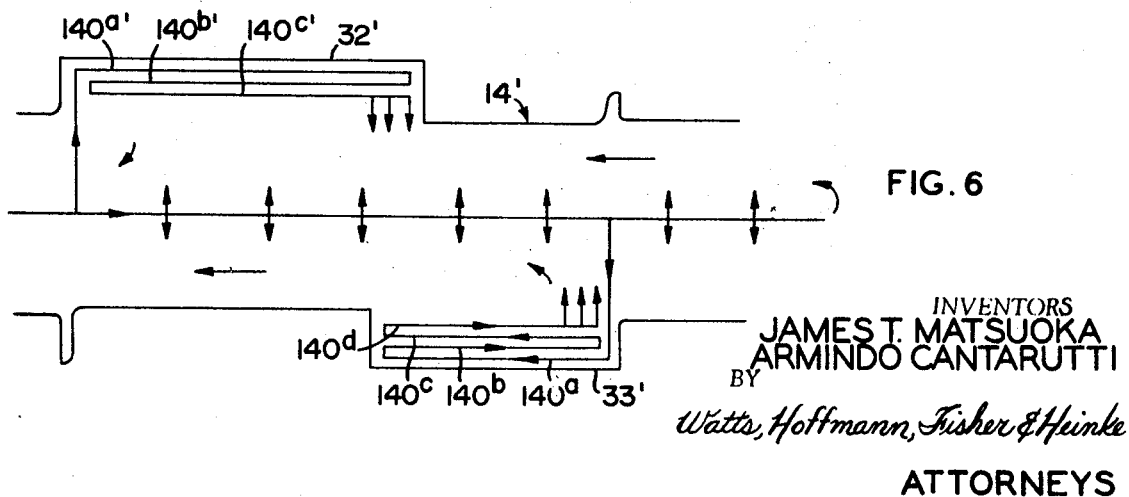
FIG. 6 is a schematic flow diagram of a rotor similar to that of FIG. 5, but illustrating a modified flow path.

A modified construction of a rotor 14' is shown in FIG. 6 of the drawings. This rotor is identical to the rotor 14 shown diagrammatically in FIG. 5 except that the blade 33' farthest from the water end of the rotor has four series-connected passageways 140$a$, 140$b$, 140$c$, 140$d$. As a result, the series flow through the blade 33' discharges into the central cavity of the rotor adjacent the far shroud 31'. Thus, the entire flow through both blades is not discharged at a central location within the central cavity and this enhances the tendency of the discharged liquid to flow along the cavity toward the water end of the rotor, where it is discharged. The blade 32' includes the three passageways 140$a'$, 140$b'$, 140$c'$ as in the flow diagram of FIG. 6.

From the preceding detailed description, it will be apparent that a rotary member for mixing or working materials such as rubber, plastic and the like has been provided in which a plurality of passageways extend through a curved portion of a blade closely adjacent the outer surface thereof where the maximum heat is generated during operation. This flow enhances the transfer of heat between the surface of the blade and a heat transfer fluid circulated through the passageways, which in turn facilitates the use of higher powered mixers which more intensively work the material being mixed, achieving higher production rates and more efficient operation. It will be understood, of course, that while a preferred embodiment of this invention has been described in detail, various modifications or alterations may be made therein within the scope and spirit of the invention.

What is claimed is:

1. A rotor for mixing or working material such as rubber, plastic and the like, comprising axially spaced shaft portions adapted to be journaled for rotation about a longitudinal axis and a hollow blade portion of substantial wall thickness therebetween providing a helically curved part extending radially outwardly relative to the rotor axis constructed to work or mix materials and including a tip portion having a leading side that extends in a helical path provided with a helically curved groove therein parallel with the tip, a helically curved striplike member closing the top of said groove forming with said groove a helically curved passageway within the tip portion of said blade, and an inlet to and an outlet from said curved passageway for the circulation of heat transfer liquid through said curved passageway.

2. A rotor for mixing or working material such as rubber, plastic and the like, comprising axially spaced shaft portions adapted to be journaled for rotation about a longitudinal axis and two axially spaced hollow blade portions of substantial wall thickness therebetween each providing a helically curved part extending radially outwardly relative to the rotor axis constructed to work or mix materials adapted to have a heat transfer liquid circulated therethrough and including a tip portion having a leading side that extends in a helical path provided with a plurality of helically curved grooves therein parallel with the tip, a helically curved striplike member closing the top of each of said grooves forming with said grooves helically curved passageways within the top portion of said blade portions, said blade portions being offset circumferentially from one another and an inlet to and an outlet from said curved passageways for the circulation of heat transfer liquid through said curved passageways.